US011384917B1

(12) United States Patent
Chen et al.

(10) Patent No.: US 11,384,917 B1
(45) Date of Patent: Jul. 12, 2022

(54) HEADLIGHT AND PROJECTION DEVICE FOR VEHICLES

(71) Applicant: Young Optics Inc., Hsinchu (TW)

(72) Inventors: S-Wei Chen, Hsinchu (TW); Chia-Yun Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 17/308,062

(22) Filed: May 5, 2021

(30) Foreign Application Priority Data

Mar. 2, 2021 (TW) ................................ 110107214

(51) Int. Cl.

| | |
|---|---|
| ***B60Q 9/00*** | (2006.01) |
| ***F21S 41/683*** | (2018.01) |
| ***F21S 41/25*** | (2018.01) |
| ***F21S 41/153*** | (2018.01) |
| ***F21S 41/47*** | (2018.01) |
| ***F21S 41/43*** | (2018.01) |

(52) U.S. Cl.
CPC ........... *F21S 41/683* (2018.01); *F21S 41/153* (2018.01); *F21S 41/25* (2018.01); *F21S 41/43* (2018.01); *F21S 41/47* (2018.01)

(58) Field of Classification Search
None
See application file for complete search history.

(56) References Cited

U.S. PATENT DOCUMENTS

| | | | |
|---|---|---|---|
| 5,622,418 A | 4/1997 | Daijogo et al. | |
| 7,889,410 B2 | 2/2011 | Liao et al. | |
| 2021/0004019 A1* | 1/2021 | Chang ................. | G05D 1/0246 |

FOREIGN PATENT DOCUMENTS

| | | |
|---|---|---|
| TW | I256518 | 6/2006 |
| TW | I350425 | 10/2011 |

* cited by examiner

*Primary Examiner* — Elmito Breval
(74) *Attorney, Agent, or Firm* — JCIPRNET

(57) ABSTRACT

A headlight for vehicles, including an image light source, a lens module, a lens cover, and a driving device, is provided. The lens module includes a lens assembly and an aperture. The lens assembly is disposed at downstream of an optical path of the image light source. The aperture includes a base and a movable mechanical member. The aperture is disposed at the downstream of the optical path of the image light source. The lens cover is disposed at downstream of an optical path of the aperture. The driving device is connected to the aperture. The driving device includes a power source and a linkage member connected to the movable mechanical member. The lens module includes at least two aperture values, and the aperture values are both not greater than 2.0.

15 Claims, 2 Drawing Sheets

| Element | Surface | Radius of curvature (mm) | Spacing (mm) | Refractive index | Abbe number | Material |
|---|---|---|---|---|---|---|
| First lens 122 | Surface S1 | 38.43 | 15.19 | 1.59 | 29.00 | Plastic |
| | Surface S2 | 570.29 | 14.18 | | | |
| Aperture 130 | Surface S3 | Infinity | 21.38 | | | |
| Second lens 124 | Surface S4 | 17.57 | 10.55 | 1.74 | 44.85 | Glass |
| | Surface S5 | 66.18 | 6.11 | | | |
| Image light source 110 | Surface S6 | Infinity | | | | |

HEADLIGHT AND PROJECTION DEVICE FOR VEHICLES

CROSS-REFERENCE TO RELATED APPLICATION

This application claims the priority benefit of Taiwan application serial no. 110107214, filed on Mar. 2, 2021. The entirety of the above-mentioned patent application is hereby incorporated by reference herein and made a part of this specification.

BACKGROUND

Technical Field

This disclosure relates to an optical device, and in particular to a headlight and a projection device for vehicles.

Description of Related Art

With advancements in science and technology, the invention of vehicles such as automobiles has rapidly shortened the distance between humans. Although the automobile technology has brought convenience to the lives of people, at the same time, the number of casualties due to traffic accidents remains high due to the lack of wholesome driving education and training, and cultivation of good driving habits. Therefore, developed countries and major car manufacturers are actively seeking for a way to apply technology to vehicles to improve the safety of the vehicles and reduce the incidence of traffic accidents. Therefore, how to improve driving safety remains the primary goal in this field.

However, in the current technology, the projection lens module of the car lamp does not have the function of adjusting its aperture, and a balance has to be found between the brightness, resolution, and contrast. Therefore, an additional indicator light assembly has to be configured whenever an additional indicative light is provided.

SUMMARY

This disclosure provides a headlight for vehicles, which can provide a high-brightness illumination light, and high-resolution and high-contrast indicative patterns.

The disclosure provides a headlight for vehicles, which includes an image light source, a lens assembly, an aperture, a lens cover, and a driving device. A lens module includes the lens assembly and the aperture. The lens assembly is disposed at downstream of an optical path of the image light source. The aperture includes a base and a movable mechanical member. The aperture is disposed at the downstream of the optical path of the image light source. The lens cover is disposed at downstream of an optical path of the aperture. The driving device is connected to the aperture. The driving device includes a power source and a linkage member connected to the movable mechanical member. The lens module includes at least two aperture values, and the aperture values are both not greater than 2.0.

The disclosure also provides a projection device for vehicles, which includes a matrix image light source, a lens module, and a driving device. The lens module includes two diopter lenses and an aperture. The lens module is disposed at downstream of an optical path of the image light source. The aperture includes a movable mechanical member. The driving device is ly connected to the aperture. The driving device includes a driving mechanism and a linkage mechanical member connected to the movable mechanical member. The driving mechanism may drive the linkage mechanical member and drive the movable mechanical member to change an aperture value of the projection device, and the aperture value of the projection device is less than or equal to 2.0.

Based on the above, in the headlight and the projection device of the disclosure, the aperture includes the movable mechanical member, and the driving device includes the power source and the linkage member connected to the movable mechanical member. Therefore, beams of different patterns may be provided by the image light source, and the aperture may be adjusted by the driving device, so as to adjust the aperture value. This enables the high-brightness illumination light or the high-resolution and high-contrast indicative patterns to be provided in the different situations. In this way, the driving safety can be improved, and allows the driver to enjoy good quality during driving.

To make the abovementioned more comprehensible, several embodiments accompanied by drawings are described in detail as follows.

DESCRIPTION OF THE EMBODIMENTS

Figure 1:
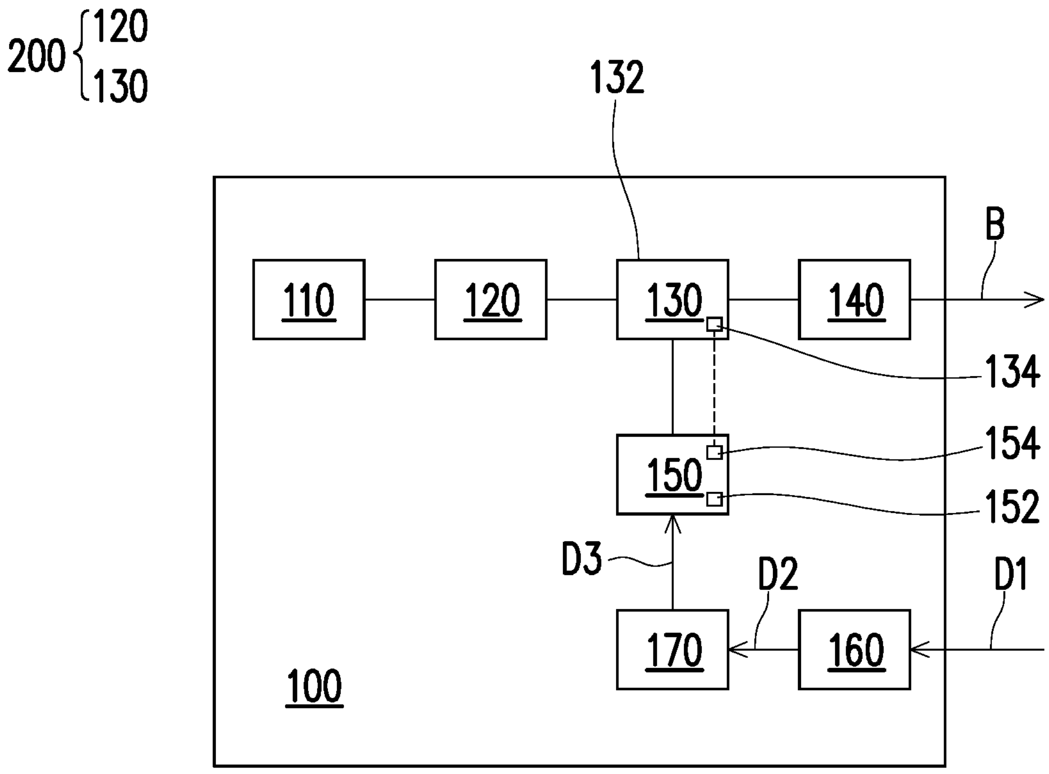
FIG. 1 is a schematic diagram of a headlight according to an embodiment of the disclosure.
Figures 2, 3:
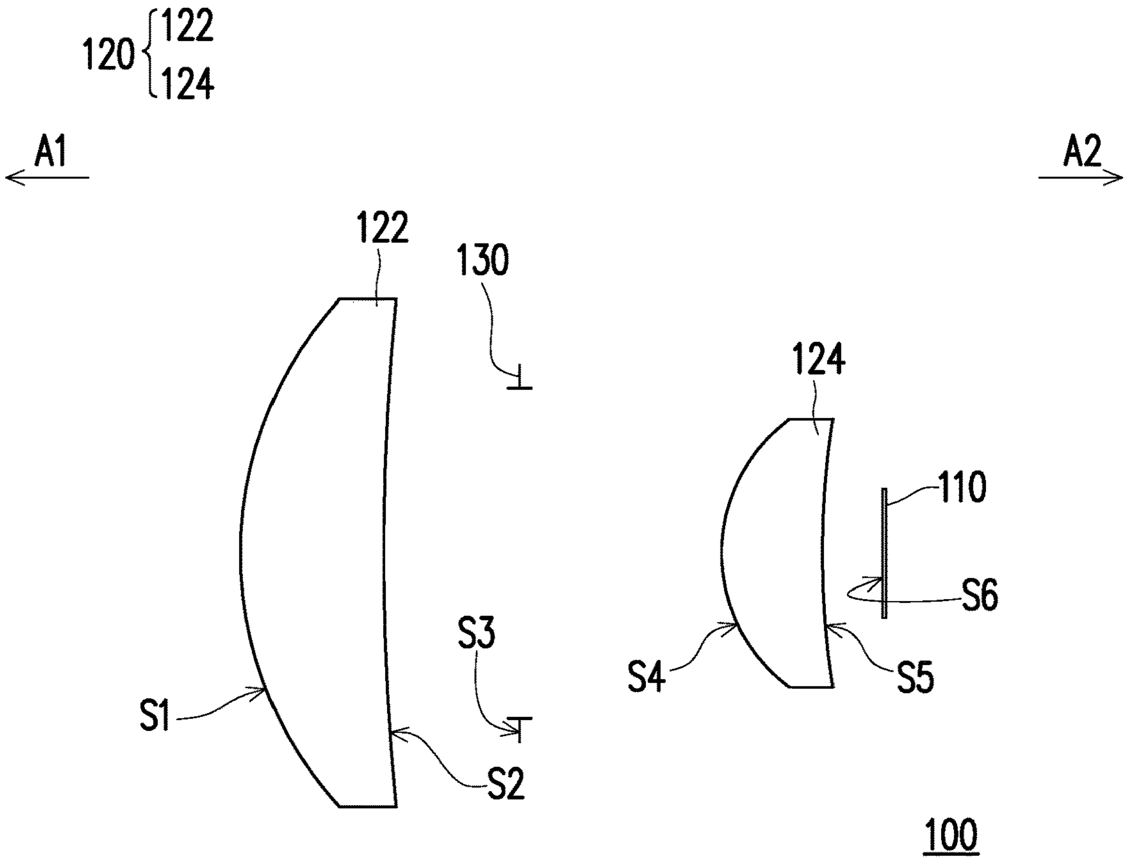
FIG. 2 is another schematic diagram of the headlight according to the embodiment in FIG. 1 on an optical axis.
FIG. 3 shows detailed optical data of the headlight according to the embodiment in FIG. 2.

FIG. 1 is a schematic diagram of a headlight according to an embodiment of the disclosure. FIG. 2 is another schematic diagram of the headlight according to the embodiment in FIG. 1 on an optical axis. With reference to FIGS. 1 and 2 concurrently, the embodiment provides a headlight 100 for vehicles, which has a function of automatically adjusting an aperture value, and may provide a high-brightness illumination light, and high-resolution and high-contrast indicative patterns. That is, a projection device for vehicles. In the embodiment, the headlight 100 includes an image light source 110, a lens module 200 (including a lens assembly 120 and an aperture 130), a lens cover 140, and a driving device 150. The image light source 110 in the headlight 100 is configured to provide an image beam B, and the lens assembly 120 and the lens cover 140 are configured on a transmission path of the image beam B. The lens module 200 includes at least two diopter lenses, which are configured to project the image beam B out of the headlight 100 to a projection target (not shown), such as a road or a wall. The headlight 100 of the embodiment may be widely used in railway vehicles, cars, bicycles, motorcycles, airplanes, and other vehicles.

In detail, in the embodiment, the image light source 110 is, for example, a micro light-emitting diode array (micro LED array) or a digital micromirror device (DMD), which is usually a matrix type image light source, but the disclosure is not limited thereto. The image beam B provided by the image light source 110 may vary at different timings, such as in an illumination state or an indicative state. The shape of a projection spot of the image beam B in the illumination state is different from the shape of a projection spot of the image beam in the indicative state. Specifically, the image beam B in the illumination state is, for example, a light beam with a higher light intensity and no specific pattern, which is configured to be used as an illumination light with sufficient brightness and in compliance with regulations during driving. The image beam B in the indicative state is, for example, a beam with a specific pattern, for example, a geometric pattern such as an arrow, a square, a triangle, and a circle, which is configured to serve as a pattern or a signal having reminding applications during driving.

FIG. 3 shows detailed optical data of the headlight according to the embodiment in FIG. 2. With reference to FIGS. 2 and 3 concurrently, the lens assembly 120 is disposed at downstream of an optical path of the image light source 110. That is, it is configured on a transmission path of the image beam B, and is configured to enlarge and project the image beam B to the projection target. The lens assembly 120 may be a combination of multiple optical lenses with diopters that are all non-zero, but the disclosure is not limited thereto. In the embodiment, a material of at least a part of the lens is plastic, and a material of at least another part of the lens is glass, but the disclosure is not limited thereto.

For example, in the embodiment, the lens assembly 120 is composed of two lenses. The lens assembly 120 includes a first lens 122 and a second lens 124. The material of the first lens 122 is plastic, and a surface S1 of the first lens 122 facing a magnification side A1 is convex, and a surface S2 facing a reduction side A2 is concave. The material of the second lens 124 is glass, and a surface S4 of the second lens 124 facing the magnification side A1 is convex, and a surface S5 facing the reduction side A2 is concave. In addition, in the embodiment, surfaces S1, S2, S3, S4, S5, and S6 of the first lens 122, an aperture 130, the second lens 124, and the image light source 110 may all be aspherical, but the disclosure is not limited thereto. Other detailed optical data of the embodiment is shown in FIG. 3.

With reference to FIGS. 1 to 3 again, the aperture 130 is disposed at downstream of the optical path of the image light source 110. That is, it is configured on the transmission path of the image beam B, and is configured to control an aperture value of the headlight.

In the embodiment, the aperture 130 is configured between two adjacent lenses, that is, between the first lens 122 and the second lens 124. However, in other embodiments, the aperture 130 may also be configured on a side of the first lens 122 facing the magnification side A1, or may be configured on a side of the second lens 124 facing the reduction side A2, but the disclosure is not limited thereto. The aperture 130 has an aperture value, and the aperture 130 changes the aperture value according to the state of the image beam B. In detail, the aperture 130 includes a base 132 and a movable mechanical member 134. Specifically, the base 132 is, for example, a metal hollow frame, and the movable mechanical member 134 is, for example, a deformable mechanism configured in the base 132, and is configured to change a hole diameter to adjust the aperture value. In the embodiment, the lens module 200 has at least two aperture values, and the at least two aperture values are both not greater than 2.0. That is, the movable mechanical member 134 of the aperture 130 may switch to at the hole diameter with the at least two different aperture values. A projection aspect ratio of the projection device is preferably between 2.5:1 and 6:1.

The lens cover 140 is disposed at downstream of an optical path of the aperture 130. That is, it is configured on the transmission path of the image beam B, and the aperture 130 is located between the image light source 110 and the lens cover 140. The lens cover 140 covers optical elements such as the lens assembly 120 and the aperture 130.

The driving device 150 is connected to the aperture 130, and the driving device 150 includes a power source 152 and a linkage member 154 connected to the movable mechanical member 134 of the aperture 130. That is, the power source 152 of the driving device 150 is connected to the movable mechanical member 134 of the aperture 130 through the linkage member 154 directly or indirectly. Specifically, the power source 152 is, for example, an electromagnet, or a motor, in a form of a driving mechanism such as a voice coil motor or a stepping motor. The linkage member 154 is, for example, a connecting rod or a gear. The power source 152 is configured to provide power to drive the linkage member 154, and then drives the movable mechanical member 134 of the aperture 130 by the linkage member 154. Therefore, the aperture 130 may be driven by the driving device 150 to adjust the aperture value of the headlight 100, and then allows the image light source 110 to provide the high-brightness illumination light or the high-resolution and high-contrast indicative patterns in different situations. In this way, driving safety can be improved, and enables a driver to enjoy good quality during driving.

In the embodiment, the headlight 100 further includes a sensing unit 160 and a calculation unit 170. The sensing unit 160 is electrically connected to the calculation unit 170, and the calculation unit 170 is electrically connected to the driving device 150. The sensing unit 160 is configured to receive an external signal D1, so as to generate an electronic signal D2, and the calculation unit 170 is configured to receive the electronic signal D2, so as to generate a control signal D3 to the driving device 150. The sensing unit 160 is, for example, a photosensitive element such as a charge-coupled device (CCD) or a complementary metal-oxide-semiconductor (CMOS) transistor. The calculation unit 170 is, for example, a central processing unit (CPU) or an engine control unit (ECU). The projection aspect ratio of the projection device is between 2.5:1 and 6:1. However, the disclosure is not limited thereto.

Therefore, the calculation unit 170 controls the driving device 150, so to adjust the hole diameter of the aperture 130 to become larger when the image beam B provided by the image light source 110 is in the illumination state. This enables the image beam B in the illumination state to pass through the aperture 130 with a large hole diameter, so as to provide sufficient brightness. On the other hand, the calculation unit 170 controls the driving device 150 to adjust the hole diameter of the aperture 130 to become smaller when the image beam B provided by the image light source 110 is in the indicative state. This enables the image beam B in the indicative state to pass through the aperture 130 with a small hole diameter, so as to increase the resolution of illumination patterns.

For example, in the embodiment, the calculation unit 170 controls the driving device 150 according to the image light source 110, so as to adjust the aperture value of the aperture 130 to f/0.7, thereby achieving an efficiency of 38.9% when the image beam B provided by the image light source 110 is in the illumination state. On the other hand, the calculation unit 170 controls the driving device 150 according to the image light source 110, so as to adjust the aperture value of the aperture 130 (that is, the movable mechanical member 134 that drives the aperture 130) to f/1.5 when the image beam B provided by the image light source 110 is in the indicative state, thereby obtaining high-resolution optical patterns, and then indicating traffic information to be provided to other drivers. In other words, in the embodiment, the aperture value corresponding to the image beam B in the illumination state is less than the aperture value corresponding to the image beam B in the indicative state.

Therefore, the headlight 100 of the embodiment may provide light beams of different patterns through the image light source 110, and adjust the hole diameter of the aperture 130 through the driving device 150, so as to adjust the aperture value. This enables the high-brightness illumination light or the high-resolution and high-contrast indicative patterns to be provided in the different situations. In this way, the driving safety can be improved, and enables the driver to enjoy good quality during driving.

In summary, in the headlight and the projection device according to the disclosure, the aperture includes the movable mechanical member, and the driving device includes the power source and the linkage member connected to the movable mechanical member. Therefore, the beams of different patterns may be provided by the image light source, and the hole diameter of the aperture may be adjusted by the driving device, so as to adjust the aperture value. This enables the high-brightness illumination light or the high-resolution and high-contrast indicative patterns to be provided in the different situations. In this way, the driving safety can be improved, and enables the driver to enjoy good quality during driving.

Although the disclosure has been described with reference to the abovementioned embodiments, but it is not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A headlight for vehicles, comprising:
an image light source;
a lens module, comprising:
a lens assembly, disposed at downstream of an optical path of the image light source; and
an aperture, comprising a base and a movable mechanical member, and the aperture is disposed at downstream of the optical path of the image light source;
a lens cover, disposed at downstream of an optical path of the lens assembly; and
a driving device, connected to the aperture, and comprising a power source and a linkage member connected to the movable mechanical member, wherein the lens module comprises at least two aperture values, and the at least two aperture values are both less than or equal to 2.0.

2. The headlight for vehicles according to claim 1, wherein the image light source is a digital micromirror device or a micro light-emitting diode display.

3. The headlight according to claim 1, wherein the power source is an electromagnet, a voice coil motor, or a stepping motor.

4. The headlight according to claim 1, wherein the linkage member is a connecting rod.

5. The headlight according to claim 1, further comprising:
a sensing unit, configured to receive an external signal, so as to generate an electronic signal.

6. The headlight according to claim 5, further comprising:
a calculation unit, configured to receive the electronic signal sent by the sensing unit, so as to generate a control signal.

7. The headlight according to claim 6, wherein the driving device receives the control signal sent by the calculation unit, so as to drive the movable mechanical member.

8. A projection device for vehicles, comprising:
an image light source;
a lens module, comprising two diopter lenses and an aperture, wherein the lens module is disposed at downstream of an optical path of the image light source, and the aperture comprises a movable mechanical member; and
a driving device, mechanically connected to the aperture, and comprising a power source and a linkage member connected to the movable mechanical member, wherein the aperture value of the projection device is less than or equal to 2.0.

9. The projection device according to claim 8, wherein the power source is an electromagnet or a motor.

10. The projection device according to claim 8, wherein the linkage mechanical member is a connecting rod or a gear.

11. The projection device according to claim 8, further comprising:
a sensing unit, configured to receive an external signal, so as to generate an electronic signal.

12. The projection device according to claim 11, further comprising:
a calculation unit, configured to receive the electronic signal sent by the sensing unit, so as to generate a control signal.

13. The headlight according to claim 12, wherein the driving device receives the control signal sent by the calculation unit, so as to drive the movable mechanical member.

14. The projection device according to claim 8, wherein the image light source provides an image beam, and the image beam has an illumination state or an indicative state at different timings, and the image beam respectively corresponds to the at least two aperture values.

15. The projection device according to claim 14, wherein a projection aspect ratio is between 2.5:1 and 6:1.

* * * * *